United States Patent [19]
Nishizawa et al.

[11] Patent Number: 5,094,074
[45] Date of Patent: Mar. 10, 1992

[54] CATALYTIC CONVERTER WITH METALLIC CARRIER AND METHOD FOR PRODUCING SAME

[75] Inventors: Kimiyoshi Nishizawa, Kamiohokanishi; Takashi Yamada; Hideharu Ehara, both of Yokohama, all of Japan

[73] Assignee: Nissan Motor Co., Ltd., Yokohama, Japan

[21] Appl. No.: 652,077

[22] Filed: Feb. 8, 1991

[30] Foreign Application Priority Data

Feb. 23, 1990 [JP] Japan ................................. 2-43258
Nov. 2, 1990 [JP] Japan ................................. 2-295527

[51] Int. Cl.$^5$ ......................... F01N 3/28; B21D 47/00
[52] U.S. Cl. ................................. 60/300; 29/890; 60/299; 422/174; 422/180; 502/527
[58] Field of Search ............ 60/300, 299; 422/180, 422/174; 502/527; 29/890

[56] References Cited

U.S. PATENT DOCUMENTS

| | | | |
|---|---|---|---|
| 3,770,389 | 10/1973 | Kitzner et al. ........................ | 60/300 |
| 4,619,912 | 10/1986 | Jalbing ............................... | 502/527 |
| 4,782,570 | 11/1988 | Spridco ............................. | 29/890 |
| 4,976,929 | 12/1990 | Cornelison ........................ | 60/300 |

FOREIGN PATENT DOCUMENTS

| | | | |
|---|---|---|---|
| 3341868 | 5/1985 | Fed. Rep. of Germany ...... | 422/180 |
| 3616809 | 11/1987 | Fed. Rep. of Germany ...... | 502/527 |

*Primary Examiner*—Douglas Hart
*Attorney, Agent, or Firm*—Foley & Lardner

[57] ABSTRACT

A catalytic converter for purifying exhaust gas from an automotive vehicle engine. The catalytic converter is composed of a metallic carrier for catalyst metal, disposed inside a casing. The metallic carrier is constructed of a main sheet metal structure which is formed by turning up an elongate flat sheet metal in a zigzag manner in cross-section, so that the main sheet metal structure has a plurality of parallel flat portions. The adjacent flat portions define therebetween a space. The main sheet metal structure is coated over all of its surfaces with an electrically insulative alumina layer. A plurality of corrugated sheet metal spacers are disposed and secured in the respective spaces thereby to define fine gas passages through which exhaust gas flows. Thus, the main sheet metal structure is electrically insulated from the corrugated sheet metal spacers, so that electric current is passed only through the main sheet metal structure. The main sheet metal structure serves as a heater element for promoting activation of the catalyst metal.

20 Claims, 7 Drawing Sheets

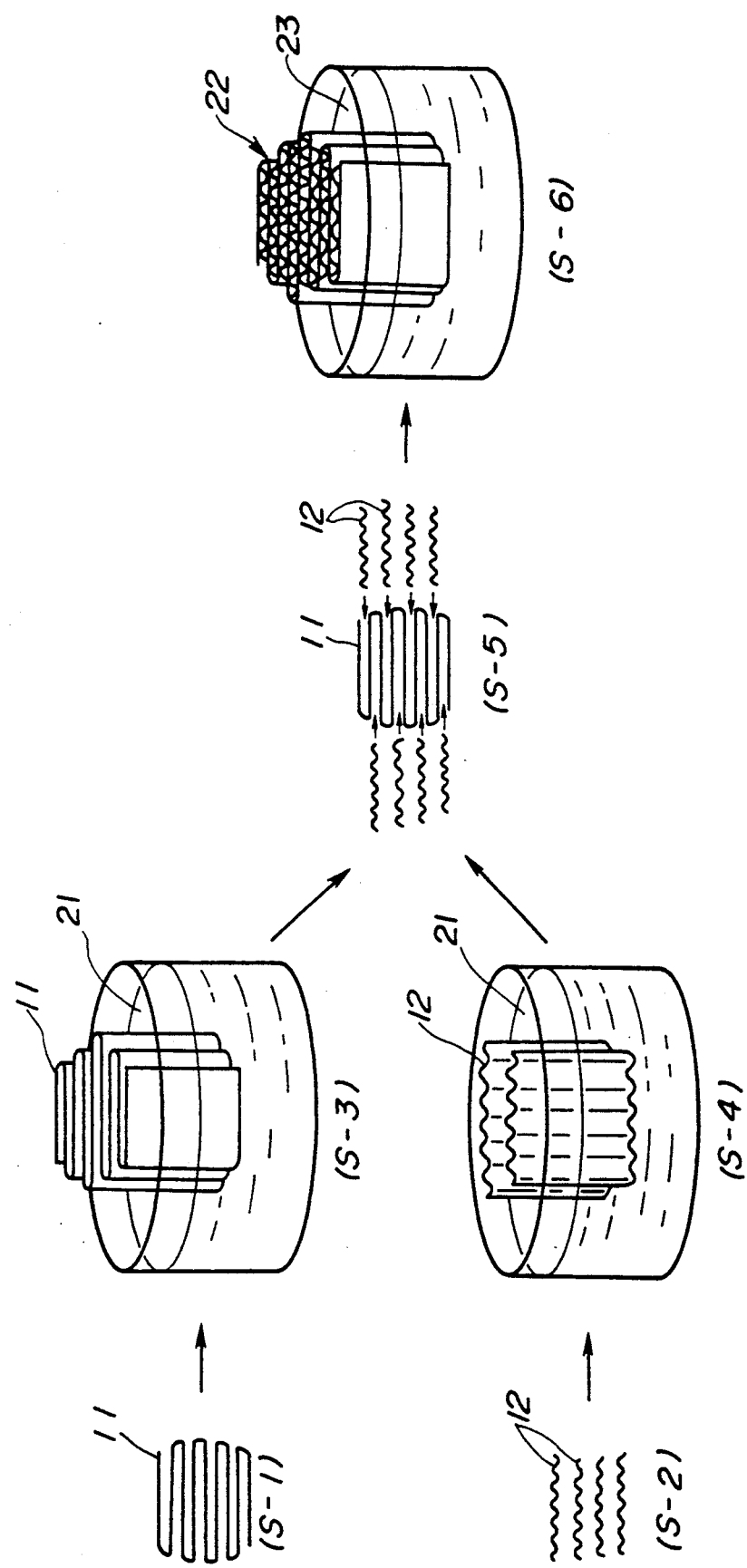

CATALYTIC CONVERTER WITH METALLIC CARRIER AND METHOD FOR PRODUCING SAME

BACKGROUND OF THE INVENTION

1. Field of the Invention

This invention relates to a catalytic converter for purifying gas such as exhaust gas from an automotive internal combustion engine and to a method of producing the same, and more particularly to such a catalytic converter including a metallic carrier which serves also as a heater element for promoting activation of catalyst metal and to a method of producing the same.

2. Description of the Prior Art

A variety of catalytic converters have been used for purifying exhaust gas emitted from an internal combustion engine of an automotive vehicle. It is a recent trend that a catalytic converter including a metallic carrier has been widely used because of being advantageous from view points of thermal capacity and pressure drop characteristics. As is well known, catalyst substances of the catalytic converter cannot exhibit a sufficient catalytic action if the temperature of the catalytic substances has not reached a predetermined activation level. Accordingly, a considerable time is required to cause the catalytic action of the catalytic substances to reach a sufficient level at starting of the engine.

In this regard, it has been proposed to heat the catalytic substances by using a heater. For this purpose, the above-mentioned metallic carrier is constructed of electrically conductive sheet metals in which one of the sheet metals are used as a resistor or heater element. A stainless steel sheet is usually used as the sheet metal from view points of heat resistance and the like. Such a stainless steel sheet is considerably low in resistivity, and therefore a resistance necessary for the heater element cannot be obtained in case that electric current is passed to a generally cylindrical metallic carrier in a diametrical direction or in a longitudinal direction.

In view of the above, it has been proposed that flat and corrugated sheet metals are coated with electrically insulative ceramic layers and then thereby forming a generally cylindrical metallic carrier. Such a metallic carrier is disclosed in U.S. Pat. No. 3,770,389. In this metallic carrier, the spirally formed flat and corrugated sheet metals are electrically insulated from each other throughout the whole length thereof, and therefore a considerable length of the sheet metal as the resistor can be obtained in case that electric current is flown through the central part and the outer peripheral part of one (for example, the corrugated sheet metal) of the flat and corrugated sheet metals).

However, the following difficulties have been encountered in the above-discussed conventional metallic carrier: The flat and corrugated sheet metals must be formed into the generally cylindrical shape by bending and spirally winding the flat and corrugated sheet metals after the flat and corrugated sheet metals are coated respectively with the electrically insulative ceramic layers. Therefore, a large amount of ceramic material is unavoidably peeled off from the ceramic layers during the step of spirally winding the flat and corrugated sheet metals. This tends to make a short circuit in the metallic carrier, thereby lowering the resistance of the sheet metal serving as the heater element. The thus lowered resistance prevent the sheet metal of the metallic carrier from serving as an effective heater element.

SUMMARY OF THE INVENTION

It is an object of the present invention to provide an improved catalytic converter including a metallic carrier which serves also as an effective heater element for promoting activation of catalyst metal carried on the metallic carrier.

Another object of the present invention is to provide an improved catalytic converter including a metallic carrier having a sheet metal which is sufficiently high in resistance so as to serve as an effective heater element.

A further object of the present invention is to provide an improved catalytic converter including a metallic carrier which has electrically insulating layers, in which electrically insulating materials are effectively prevented from peeling off from the electrically insulating layers.

An aspect of the present invention resides in a catalytic converter composed of a monolithic metallic carrier for catalyst metal, disposed in a casing. The metallic carrier includes a main sheet metal structure formed by successively turning up an elongate sheet metal a plurality of times in opposite directions. The main sheet metal structure is generally zigzag in cross-section and has a plurality of generally flat portions which are generally parallel with each other so that the adjacent two generally flat portions are separate from each other by a predetermined distance and define therebetween a space. The main sheet metal structure has first and second end portions which respectively correspond to opposite end portions of the elongate sheet metal. The first and second end portions serve as electric terminals, respectively. An electrically insulative layer is formed on a surface of the main sheet metal structure. Additionally, a plurality of heat resistant corrugated spacers are provided so that each corrugated spacer is disposed in the space and in contact with the adjacent generally flat portions to define a plurality of fine gas passages between each corrugated spacer and each generally flat portion of the main sheet metal structure.

Another aspect of the present invention resides in a method of producing a catalytic converter of the above-described structure. The method is comprised of a process of preparing a metallic carrier for catalytic metal. The process includes the following steps in the sequence set forth below: (1) An elongate sheet metal is successively turned up a plurality of times in opposite directions to obtain a main sheet metal structure of a predetermined shape which is generally zigzag in cross-section. The main sheet metal structure has a plurality of generally flat portions which are generally parallel with each other so that the adjacent two generally parallel portions are separate from each other by a predetermined distance and define therebetween a space. The main sheet metal structure has first and second end portions which respectively correspond to opposite end portions of the elongate sheet metal. The first and second end portions serve as electric terminals, respectively, through which electric current flows. (2) An electrically insulative layer is formed on a surface of the main sheet metal structure. (3) A plurality of heat resistant corrugated spacers are prepared. (4) Each corrugated spacer is inserted into each space of the main sheet metal structure to obtain an assembled body of said metallic carrier.

Accordingly, with the present invention, the main sheet metal structure having a predetermined shape is previously formed by turning up the elongate sheet metal and then coated at its surface with the electrically insulative ceramic layer. The corrugated spacers are inserted respectively into the spaces of the main sheet metal structure to form an assembly body. Thus, the main sheet metal structure is electrically insulated from the corrugated spacers and therefore can obtain a sufficient length as a resister or heater element which length is the same as that of the elongate sheet metal as the material of the main sheet metal structure, thereby making the resistance of the resistor sufficiently high. This causes the metallic carrier or heater element to generate sufficient heat. Additionally, since the sheet metal of the main sheet metal structure is never subjected to considerable deformation after coating of the electrically insulative layer, the insulative layer is prevented from peeling off from the main sheet metal structure, thereby avoiding resistance lowering and resistance scattering due to short circuit.

BRIEF DESCRIPTION OF THE DRAWINGS

In the drawings, the same reference numerals designate the same elements and parts throughout all the figures, in which:

FIG. 6 is an explanatory illustration showing an example of a process of producing the metallic carrier of FIG. 1;

DETAILED DESCRIPTION OF THE INVENTION

Figure 1:
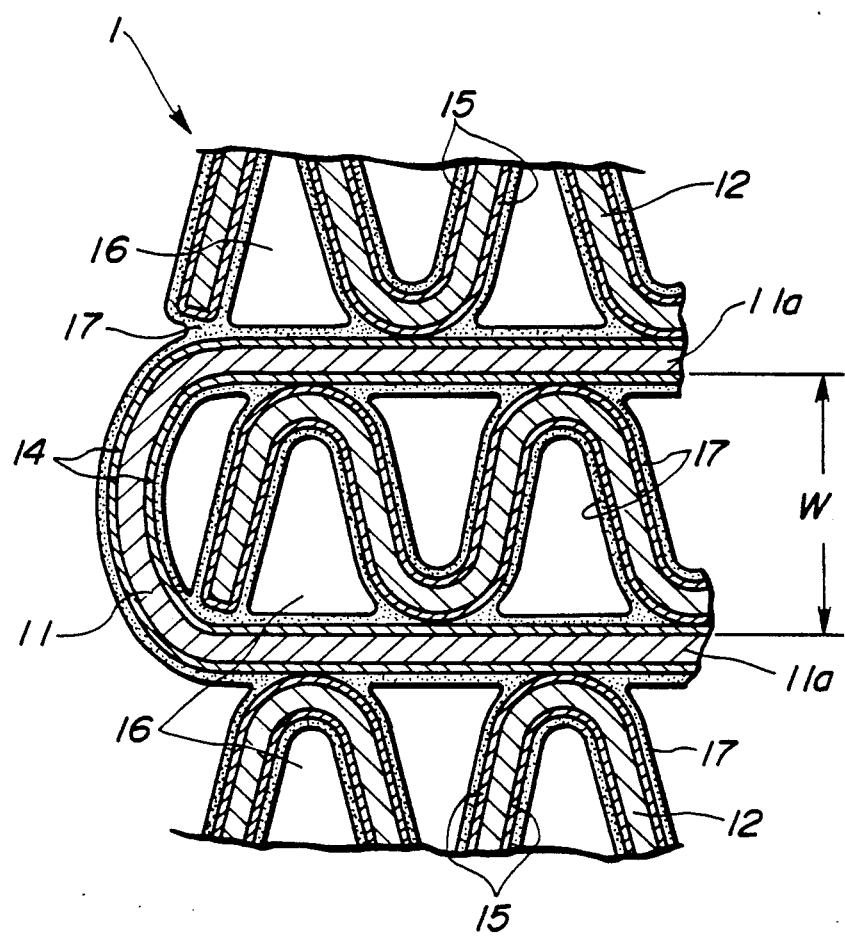
FIG. 1 is an enlarged fragmentary sectional view of a metallic carrier forming part of an embodiment of a catalytic converter in accordance with the present invention.
Figure 2:
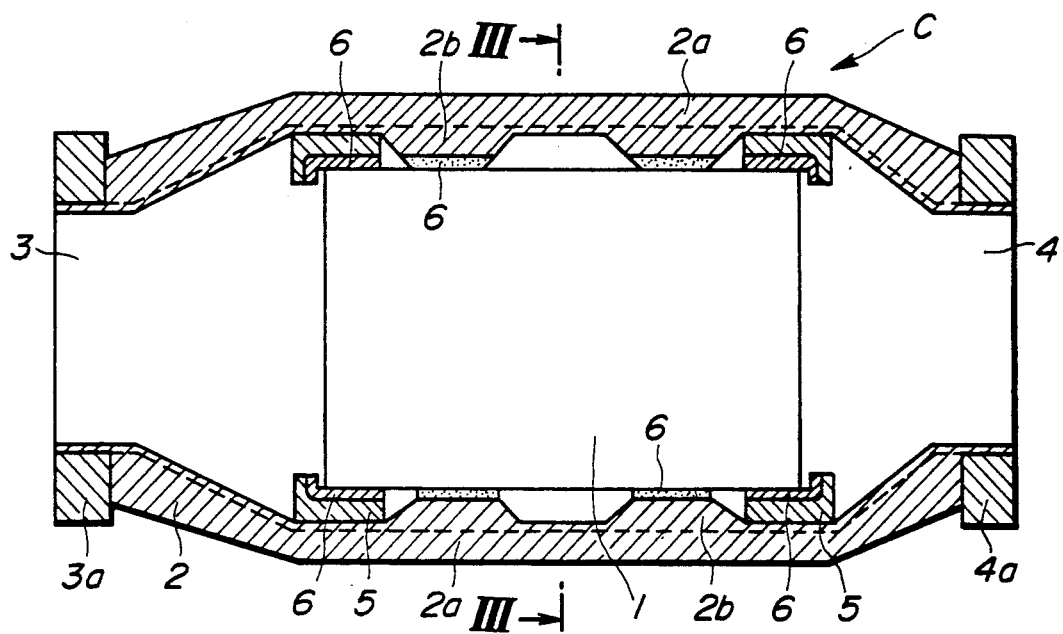
FIG. 2 is a longitudinal cross-sectional view of the catalytic converter of FIG. 1.
Figure 3:
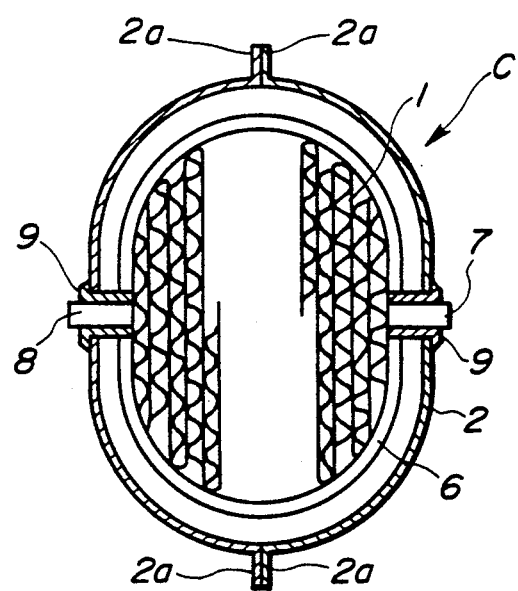
FIG. 3 is a transverse cross-sectional view taken in the direction of arrows substantially along the line III—III of FIG. 2.

Referring now to FIGS. 1 to 3, an embodiment of a catalytic converter according to the present invention is illustrated by the reference character C. The catalytic converter C is mounted on an automotive vehicle to purify exhaust gas discharged from an internal combustion engine of the vehicle, not shown. The catalytic converter C is composed of a honeycomb monolithic metallic carrier 1 for catalyst metal, disposed inside a metallic casing 2. The metallic carrier 1 is generally cylindrical and has a generally oval cross-sectional shape. The casing 2 is provided around the gas inlet 3 with a flange 3a and around the gas outlet 4 with a flange 4a. It will be understood that the casing 2 is connected through the flange 3a with an upstream portion of an exhaust pipe (no numeral) through which exhaust gas from the engine flows, and through the flange 3b with a downstream portion of the exhaust pipe, so that the catalytic converter C is positioned in the exhaust pipe. As shown in FIG. 2, the metallic carrier 1 is located inside the casing 2 in such a manner that the longitudinal axis of the metallic carrier 1 is parallel and aligned with that of the casing 2. The casing 2 is formed of two counterparts (no numerals and as shown in FIG. 2) which are independently produced to be provided respectively with flanges 2a. The flanges 2a of the respective counterparts are joined with each other by welding after the metallic carrier 1 is located in position between the counterparts.

The casing 2 is formed at its inner surface with a pair of radially inwardly extending annular portions 2b, 2b which are separate from each other and generally coaxial with the metallic carrier 1. The catalyst carrier 1 is supported at its peripheral surface by the annular portions 2b, 2b and at its opposite ends by respective annular caps 5, 5. The metallic carrier 1 is so adapted that electric current is passed through it in order that a part of the metallic carrier serves as a heater element upon being supplied with electric current, and therefore it is required to ensure an electric insulation between the metallic carrier 1 and the casing 2. In this regard, an annular alumina layer 6 having a suitable thickness is formed between the catalytic element 1 and each annular cap 5; and two same annular alumina layers 6, 6 are formed between the metallic carrier 1 and the annular portions 2b, 2b of the casing 2.

As shown in FIG. 3, the metallic carrier 1 is provided with negative and positive (minus and plus) electrodes 7, 8 which are located opposite to each other and aligned with each other generally in a direction of a short axis in the oval shape cross-section of the metallic carrier 1. Each electrode 7, 8 extends outwardly and projects through the casing 2. Each electrode 7, 8 is disposed through an electrically insulated bushing in an installation hole (no numeral) of the casing 2.

Figure 4:
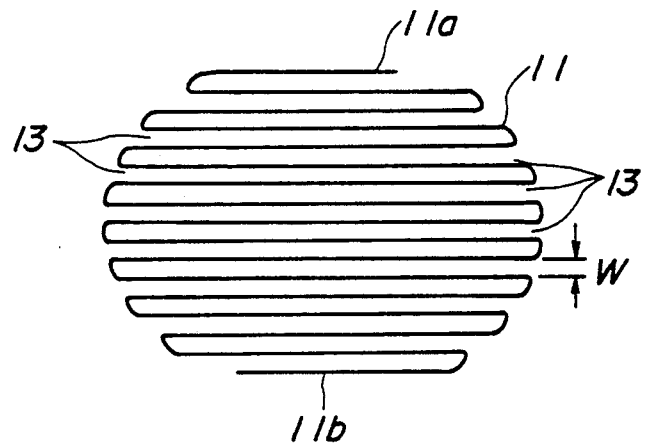
FIG. 4 is a schematic transverse sectional view of a main sheet metal structure forming part of the metallic carrier of FIG. 1.

As best shown in FIG. 1, the honeycomb monolithic metallic carrier 1 is constructed from of a main sheet metal structure 11 formed of a continuous and elongate flat sheet metal material, and a plurality of corrugated spacers 12 combined with the main metallic sheet 11 to form many small gas passages. More specifically, the main sheet metal structure 11 is formed generally zigzag in cross-section by successively turning up or bending the elongate flat sheet metal a plurality of times in alternative or opposite directions so as to form a plurality of parallel flat portions 11a as shown in FIG. 4. The adjacent flat portions 11a, 11a are separated from each other by a predetermined distance W to define therebetween a space 13 as seen in FIGS. 1 and 4. The predetermined distance W is preferably within a range from 1 to 3 mm. The thus formed main sheet metal structure 11 is shaped, as a whole, into a generally cylindrical form having a generally oval cross-section. The main sheet metal structure 11 is coated at its whole surfaces with an electrically insulative ceramic layer 14. In other words, the ceramic layer 14 is formed on the opposite side surfaces and on the whole edge surfaces of the sheet metal of the main sheet metal structure 11.

Figure 5:
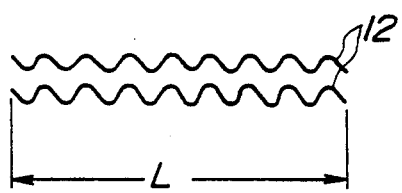
FIG. 5 is a schematic transverse sectional view of corrugated spacers forming part of the metallic carrier of FIG. 1.

Each corrugated spacer 12 is produced as follows: First, a flat sheet metal is corrugated to have corrugations each of which has a height generally equal to the difference of the thicknesses of the respective ceramic layers 14 on the opposite flat portions 11a, 11a from the distance W between the adjacent flat portions 11a, 11a of the main metal sheet structure 11. Then, the thus corrugated sheet metal is cut into a piece having a length L which corresponds to the cross-sectional lateral length of the space 13 (in FIG. 4) as shown in FIG. 5. The entire surface of the corrugated spacer 12 is coated with an electrically insulative ceramic layer 15. It will be understood that such coating for the corrugated spacers may be omitted so that the corrugated spacer 12 has no ceramic layer.

The ceramic layers 14, 15 are made of alumina, zirconia, a mixture of alumina and lanthanum oxide, a mixture of alumina and cerium oxide or the like. The sheet metal as the material of the sheet metal structure 11 and the corrugated spacer 12 is made of a stainless steel, for example, containing Fe as a major component, 20 wt % of Cr, 5 wt % of Al and a slight amount of La. Such a stainless steel has a resistivity of about 150 $\mu\Omega$·cm.

Each corrugated spacer 12 is inserted and secured in the space 13 between the flat portions 11a, 11a of the main sheet metal structure 11, thereby forming the monolithic honeycomb metallic carrier 1 of the generally cylinder shape in which the fine gas passages 16 are defined between the sheet metal of the main sheet metal structure 11 and each corrugated spacer 12. Each gas passage 16 extends along the longitudinal axis of the generally cylindrical metallic carrier 1. Under this condition, a further electrically insulative ceramic layer 17 of alumina or the like is formed over the entire surface of the metallic carrier 1. By virtue of this ceramic layer 17, the main sheet metal structure 11 and the corrugated spacers 12 are fixed to each other. In this embodiment, the ceramic layer 17 contains catalyst metal or noble metal such as Pt, so that the ceramic layer 17 serves as a catalyst layer. It will be understood that a catalyst layer may be separately coated on the surface of the ceramic layer 17 in case that the ceramic layer 17 contains no catalyst metal.

Figure 9:
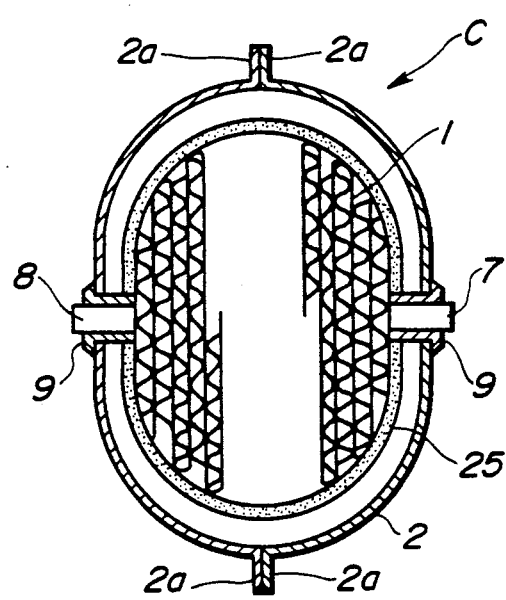
FIG. 9 is a transverse cross-sectional view taken in the direction of arrows substantially along the lines IX—IX of FIG. 8.

The thus formed metallic carrier 1 has first and second end portions 11a, 11b of the sheet metal of the main sheet metal structure 11 as shown in FIG. 4. The first and second end portions 11a, 11b correspond respectively to the opposite end portions of the elongate flat sheet metal as the material of the structure 11 and serve respectively as electric terminals for the metallic carrier 1 serving as the heater element. It will be understood that the electrodes 7, 8 shown in FIG. 9 are connected respectively to the first and second end portions 11a, 11b.

With the thus arranged honeycomb monolithic metallic carrier 1, a secure electric insulation is made between the main sheet metal structure 11 and each corrugated spacer 12 by the ceramic layers 14, 15, so that a short circuit never occurs between the main sheet metal structure 11 and each corrugated spacer 12. Thus, the whole length of the sheet metal of the main sheet metal structure 11 is effectively used as a resistor or the heater element, thereby providing a resistance of about 2.5.

Next, a method of producing the above honeycomb monolithic metallic carrier 1 will be discussed with reference to FIG. 6.

First, the flat and elongate sheet metal material is turned up a plurality of times in alternate directions to form the generally cylindrical main sheet metal structure 11 having a generally oval cross-section as discussed above (See a step S-1). Simultaneously with the above, the corrugated sheet metal is cut into pieces each having the predetermined length L thereby to prepare necessary corrugated spacers 12 (See step S-2).

The above main sheet metal structure 11 is thereafter dipped in a ceramic coating liquid 21 containing binder and the ceramic powder such as alumina powder. The thus coated main sheet metal structure 11 is then dried at 400° C.–600° C. to form the ceramic layer 14 over the entire surface of the main sheet metal structure 11 (See step S-3). Similarly, each corrugated spacer 12 having the predetermined length L is dipped in the ceramic coating liquid 21 and dried at 400° C.–600° C. to form the ceramic layer 15 on the whole surfaces thereof (See step S-4). As described above, step S-4 may be omitted so that each corrugated spacer 12 has no ceramic layer.

Subsequently, each corrugated spacer 12 is inserted into the space 13 between the adjacent flat portions 11a, 11a of the main sheet metal structure 11 (See step S-5). During this step, the space 13 is enlarged to some extent in a direction to separate the adjacent flat portions 11a, 11a from each other, and therefore each corrugated spacer 12 can be readily inserted into the space 13 without peeling off the insulating ceramic layers 14, 15.

In this condition, the main sheet metal structure 11 and the corrugated spacers 12 are temporarily fixed with each other to form an assembled body 22. The assembled body 22 is then dipped in a ceramic coating liquid 23 containing binder and alumina powder or the like and dried at 400° C.–600° C., so that the main sheet metal structure 11 and the corrugated spacers 12 are fastened to each other and rigidly assembled in which the ceramic layer 17 shown in FIG. 1 is formed (See a step S-6). Thus, the honeycomb monolithic metallic carrier 1 is produced. As mentioned above, by mixing the catalyst metal into the ceramic coating liquid 23, the ceramic layer 17 serves also as the catalyst layer.

Figure 7:
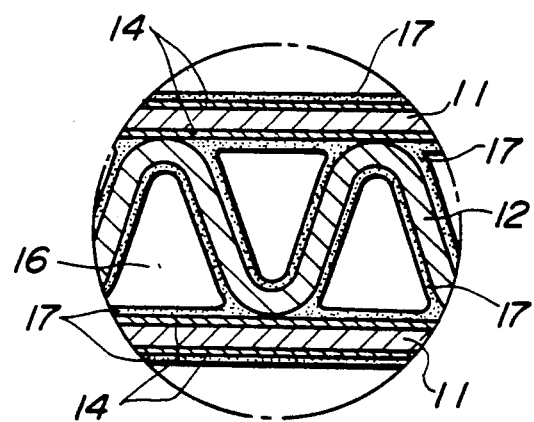
FIG. 7 is an enlarged fragmentary sectional view similar to FIG. 1 but showing another example of the metallic carrier in which a ceramic layer on each corrugated spacer is omitted.

It will be understood that if step S-4 is omitted as mentioned above, the resultant metallic carrier 1 has a structure shown in FIG. 7 in which no ceramic layer is formed on the surface of each corrugated spacer 12.

While only the main sheet metal structure 11 has been shown and described as being formed of the flat sheet metal as the material, it will be understood that it may be formed of a sheet metal which was waved or corrugated gently as compared with the corrugated spacers 12 so that the wave form of the sheet metal is seen nearly flat.

Figure 8:
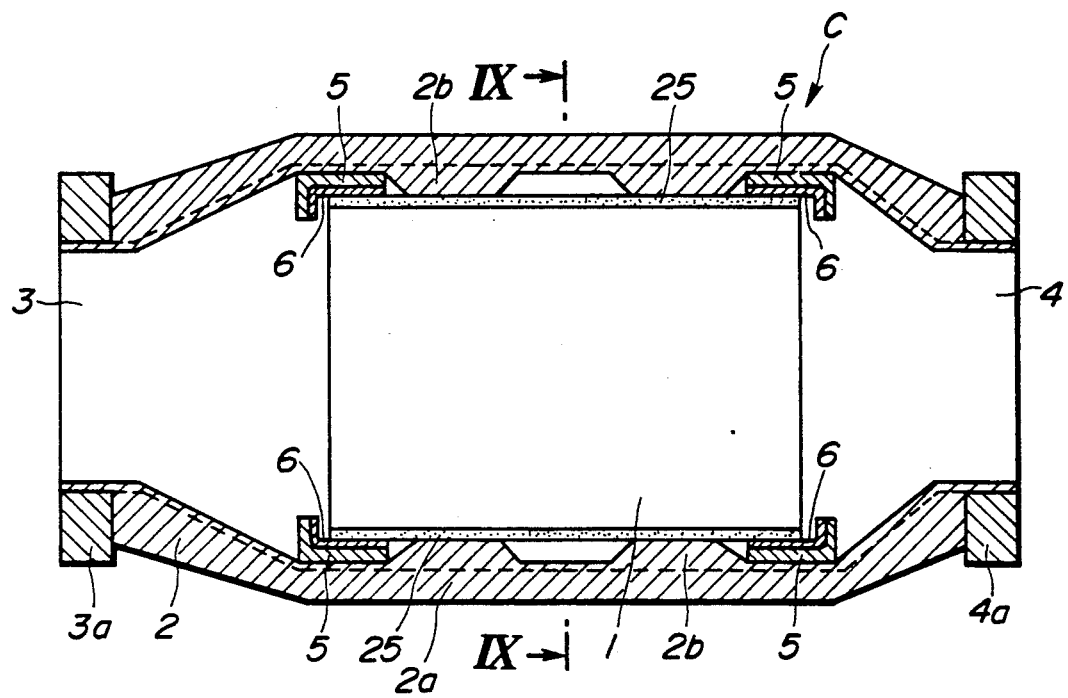
FIG. 8 is a longitudinal cross-sectional view of another embodiment of the catalytic converter in accordance with the present invention.

FIGS. 8 and 9 illustrate another embodiment of the catalytic converter C according to the present invention, which is similar to that of the embodiment of FIG. 1 to 5 except for a structure for supporting the metallic carrier 1 inside the casing 2. In this embodiment, a generally cylindrical ceramic fiber mat 25 is disposed around and in contact with the entire peripheral surface of the generally cylindrical metallic carrier 1. The ceramic fiber mat 25 is electrically insulative and therefore serves as an electrical insulator. In this embodiment, the ceramic fiber mat 25 is formed of a material which is expandable upon heating. The material is an Interam Mat (the trade name of Minnesota Mining and Manufacturing Co.) which includes an expanding agent (Barmiculite) effective upon heating, ceramic fiber and organic binder. Thus, the metallic carrier 1 is supported through the ceramic fiber mat 25 on each alumina layer 6 attached to the inner peripheral surface of each annular cap 5.

Figure 10:
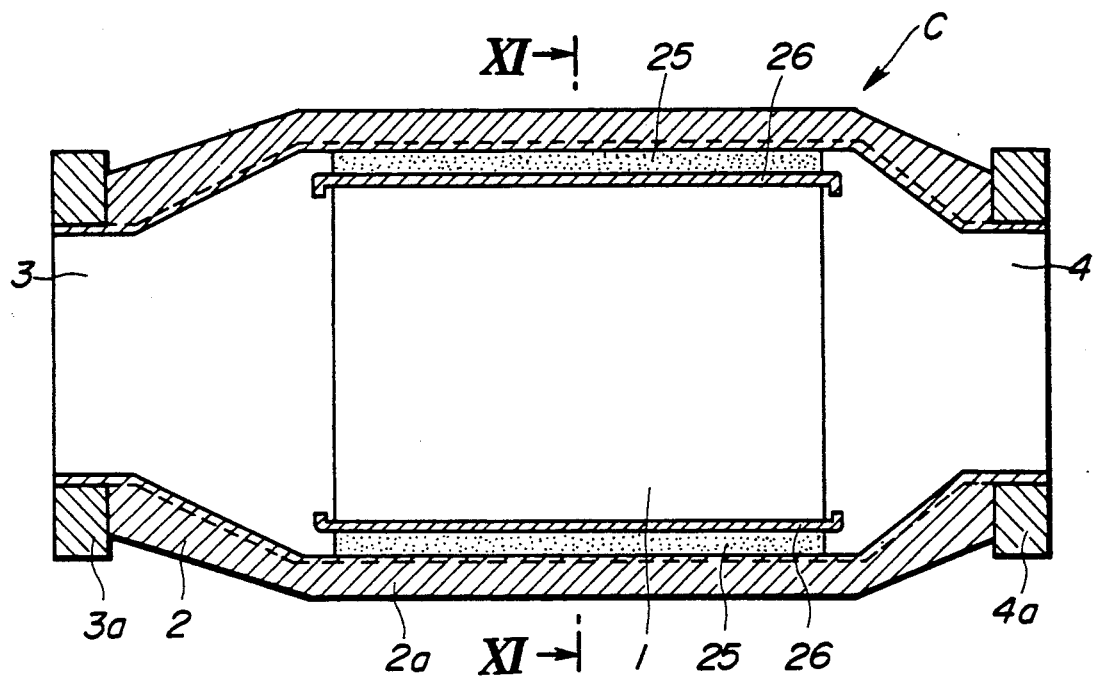
FIG. 10 is a longitudinal cross-sectional view of a further embodiment of the catalytic converter in accordance with the present invention.
Figure 11:
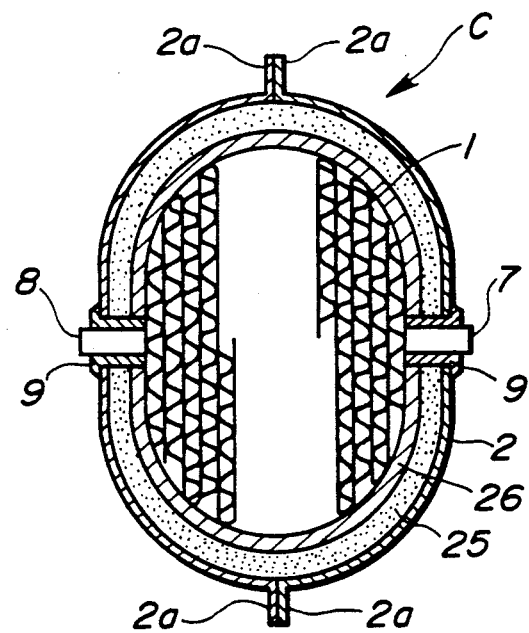
FIG. 11 is a transverse cross-sectional view taken in the direction of arrows substantially along the lines XI—XI of FIG. 10.

FIGS. 10 and 11 illustrate a further embodiment of the catalytic converter C according to the present invention, which is similar to the embodiment of FIGS. 1 to 5 with the exception that the annular caps 5 and the alumina layers 6 are omitted. In this embodiment, a generally cylindrical inner casing 26 made of ceramic is fitted on the peripheral surface of the catalytic element 1. Additionally, the cylindrical fiber mat 25 is interposed between the outer peripheral surface of the inner casing 26 and the inner peripheral surface of the casing 2. Thus, the metallic carrier 1 is securely supported inside the casing 2 through the ceramic inner casing 26 and the ceramic fiber mat 27.

Figure 12:
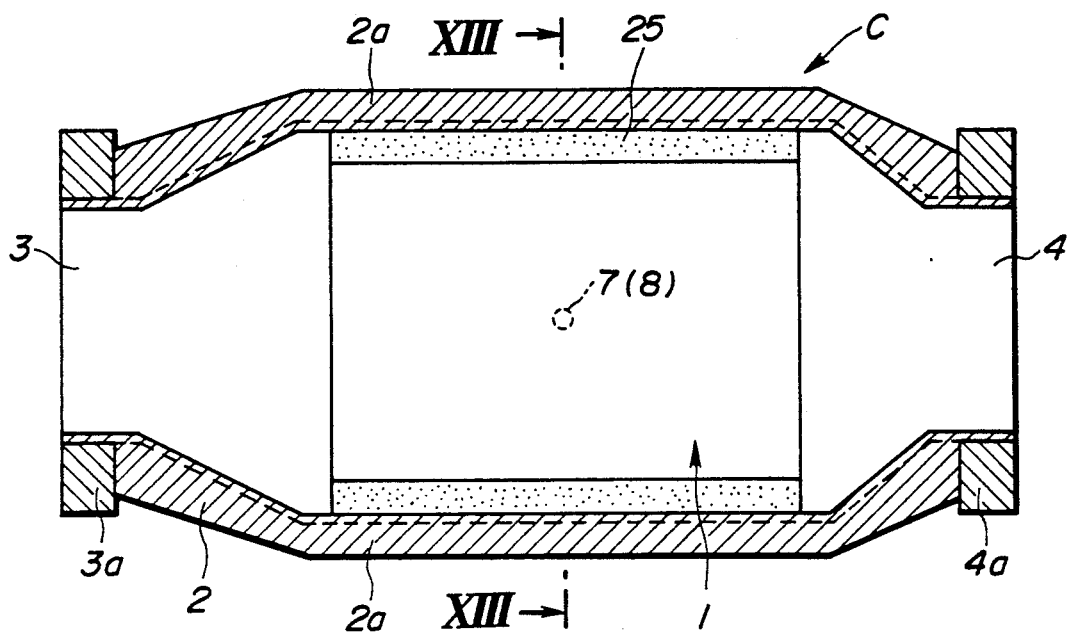
FIG. 12 is a longitudinal cross-sectional view of a further embodiment of the catalytic converter in accordance with the present invention.
Figure 13:
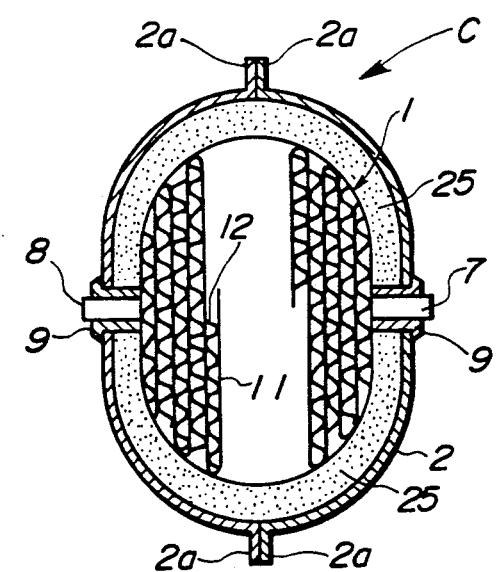
FIG. 13 is a transverse cross-sectional view taken in the direction of arrows substantially along the line XIII—XIII of FIG. 12.

FIGS. 12 and 13 illustrate a further embodiment of the catalytic converter C according to the present invention, similar to the embodiment of FIGS. 10 and 11 with the exception that the inner casing 26 is omitted. In this embodiment, the generally cylindrical fiber mat 25 is interposed between and in direct contact with the outer peripheral surface of the metallic carrier 1 and the inner peripheral surface of the casing 2.

In the catalytic converter arrangements of FIGS. 8 to 13, by virtue of the ceramic fiber mat 25, an electrical insulation between the casing 2 and the metallic carrier 1 serving also as the heater element is securely accomplished. Particularly in case that the ceramic fiber mat 25 is formed of the material expandable upon heating, the mat 25 can expand in volume as the temperature of exhaust gas passing through the catalytic converter rises, thereby securely supporting the metallic carrier 1 in position. This prevents the metallic carrier 1 from shifting in location in the diametrical and longitudinal directions of the catalytic converter C, the longitudinal direction shifting being caused by exhaust gas pressure. It will be appreciated that the ceramic fiber mat 25 improves not only a gas tight seal between the metallic carrier 1 and the casing 2, but also impact resistance and vibration resistance characteristics of the catalytic converter C.

What is claimed is:

1. A catalytic converter comprising:
   a casing; and
   a monolithic metallic carrier for catalyst metal, disposed in said casing, said metallic carrier including
   a main sheet metal structure formed by successively turning up an elongate sheet metal a plurality of times in opposite directions, said main sheet metal being generally zigzag in cross-section and having a plurality of generally flat portions which are generally parallel with each other so that adjacent two generally flat portions are separated from each other by a predetermined distance and define therebetween a space, said main sheet metal structure having first and second end portions which respectively correspond to opposite end portions of said elongate sheet metal, said first and second end portions serving respectively as electric terminals through which electric current flows;
   a first electrically insulative layer formed on a surface of said main sheet metal structure, and
   a plurality of heat resistant corrugated spacers each of which is disposed in said space and in contact with said first electrically insulative layer on the respective adjacent generally flat portions to define a plurality of fine gas passages between each corrugated spacer and each generally flat portion of the main sheet metal structure.

2. A catalytic converter as claimed in claim 1, wherein said metallic carrier further includes a heat resistant layer continuously formed throughout said electrically insulative layer on said main sheet metal structure and said corrugated spacers.

3. A catalytic converter as claimed in claim 2, wherein said heat resistant layer includes a catalyst metal.

4. A catalytic converter as claimed in claim 1, wherein said metallic carrier further includes a second electrically insulating layer formed on a surface of each corrugated spacer.

5. A catalytic converter as claimed in claim 1, wherein said first electrically insulative layer is made of ceramic.

6. A catalytic converter as claimed in claim 2, wherein said heat insulative layer is made of ceramic.

7. A catalytic converter as claimed in claim 4, wherein said second electrically insulative layer is made of ceramic.

8. A catalytic converted as claimed in claim 1, wherein said main sheet metal structure is generally cylindrical so that said metallic carrier is generally cylindrical.

9. A catalytic converter as claimed in claim 1, further comprising a generally cylindrical mat formed of heat resistant fiber and located around a peripheral surface of said metallic carrier, said metallic carrier being supported through said cylindrical mat on an inner peripheral surface of said casing.

10. A catalytic converter as claimed in claim 9, wherein said cylindrical mat is formed of heat resistant fiber.

11. A catalytic converter as claimed in claim 9, wherein said cylindrical mat is disposed in direct contact with the outer peripheral surface of said metallic carrier and the inner peripheral surface of said casing.

12. A method of producing a catalytic converter, comprising a process of preparing a metallic catalytic carrier including the following steps in the sequence set forth below:
   successively turning up an elongate sheet metal a plurality of times in opposite directions to obtain a main sheet metal structure of a predetermined shape which is generally zigzag in cross-section, said main sheet metal structure having a plurality of generally flat portions which are generally parallel with each other so that adjacent two generally flat portions are separated from each other by a predetermined distance and define therebetween a space, said main sheet metal structure having first and second end portions which respectively correspond to opposite end portions of said elongate sheet metal, said first and second end portions serving as electric terminals through which electric current flows;

forming a first electrically insulative layer on a surface of said main sheet metal structure;

preparing a plurality of heat resistant corrugated spacers; and inserting each corrugated spacer into each space of said main sheet metal structure to obtain an assembled body of said metallic carrier.

13. A method as claimed in claim 12, wherein said process further includes a step of forming a continuous heat resistant layer on a surface of said assembled body, said heat resistant layer extending throughout said main sheet metal structure and said corrugated spacers to fixedly secure them with each other, after the inserting step.

14. A method as claimed in claim 12, wherein said elongate sheet metal is generally flat.

15. A method as claimed in claim 12, wherein the step of forming a first electrically insulative layer includes dipping in a coating liquid containing ceramic powder.

16. A method as claimed in claim 12, wherein the step of preparing a plurality of heat resistant corrugated spacers includes cutting a plurality of corrugated sheet metals into respective pieces each having a predetermined dimension.

17. A method as claimed in claim 13, wherein the step of forming a continuous heat resistant layer includes dipping said assembled body into a coating liquid containing ceramic powder.

18. A method as claimed in claim 12, wherein said process further includes the step of forming a second electrically insulative layer on a surface of each corrugated spacer, between the preparing step and the inserting step.

19. A method as claimed in claim 18, wherein the step of forming a second electrically insulative layer includes dipping each corrugated spacer into a coating liquid containing ceramic powder.

20. A method as claimed in claim 12, further comprising a process of fixedly disposing said metallic catalytic carrier inside a casing to maintain a gas tight seal between said metallic carrier and said casing.

* * * * *